(12) United States Patent
Bachelder

(10) Patent No.: US 7,265,683 B2
(45) Date of Patent: Sep. 4, 2007

(54) ROADSIDE-BASED COMMUNICATION SYSTEM AND METHOD

(75) Inventor: Aaron D. Bachelder, Irvine, CA (US)

(73) Assignee: California Institute of Technology, Pasadena, CA (US)

( * ) Notice: Subject to any disclaimer, the term of this patent is extended or adjusted under 35 U.S.C. 154(b) by 209 days.

(21) Appl. No.: 11/208,243

(22) Filed: Aug. 18, 2005

(65) Prior Publication Data

US 2006/0058002 A1 Mar. 16, 2006

Related U.S. Application Data

(60) Provisional application No. 60/602,769, filed on Aug. 18, 2004.

(51) Int. Cl.
*G08G 1/095* (2006.01)
*G08G 1/07* (2006.01)

(52) U.S. Cl. ............... 340/907; 340/909; 340/902; 340/904

(58) Field of Classification Search ........... 340/907, 340/906, 909, 916, 924, 904, 902; 455/344, 455/403, 404.1, 95, 96; 701/117
See application file for complete search history.

(56) References Cited

U.S. PATENT DOCUMENTS

| | | |
|---|---|---|
| 3,550,078 A | 12/1970 | Long |
| 3,831,039 A | 8/1974 | Henschel |
| 3,859,624 A | 1/1975 | Kriofsky et al. |
| 3,881,169 A | 4/1975 | Malach |
| 3,886,515 A | 5/1975 | Cottin et al. |
| 4,017,825 A | 4/1977 | Pichey |
| 4,162,477 A | 7/1979 | Munkberg |
| 4,223,295 A | 9/1980 | Bonner et al. |
| 4,230,992 A | 10/1980 | Munkberg |
| 4,234,967 A | 11/1980 | Henschel |
| 4,296,400 A | 10/1981 | Becker Friedbert et al. |
| 4,433,324 A | 2/1984 | Guillot |
| 4,443,783 A | 4/1984 | Mitchell |
| 4,573,049 A | 2/1986 | Obeck |
| 4,661,799 A | 4/1987 | Buttemer |

(Continued)

FOREIGN PATENT DOCUMENTS

EP 0 574 009 A2 12/1993

(Continued)

OTHER PUBLICATIONS

*Intelligent Investment*, World Highways/Routes Du Monde, Jan./Feb. 1997, p. 52.

(Continued)

*Primary Examiner*—Toan N. Pham
(74) *Attorney, Agent, or Firm*—Christie, Parker & Hale, LLP.

(57) ABSTRACT

A roadside-based communication system providing backup communication between emergency mobile units and emergency command centers. In the event of failure of a primary communication, the mobile units transmit wireless messages to nearby roadside controllers that may take the form of intersection controllers. The intersection controllers receive the wireless messages, convert the messages into standard digital streams, and transmit the digital streams along a citywide network to a destination intersection or command center.

16 Claims, 4 Drawing Sheets

U.S. PATENT DOCUMENTS

| | | |
|---|---|---|
| 4,701,760 A | 10/1987 | Raoux |
| 4,704,610 A | 11/1987 | Smith et al. |
| 4,713,661 A | 12/1987 | Boone et al. |
| 4,734,863 A | 3/1988 | Honey et al. |
| 4,734,881 A | 3/1988 | Klein et al. |
| 4,775,865 A | 10/1988 | Smith et al. |
| 4,791,571 A | 12/1988 | Takahashi et al. |
| 4,799,162 A | 1/1989 | Shinkawa et al. |
| 4,914,434 A | 4/1990 | Morgan et al. |
| 4,963,889 A | 10/1990 | Hatch |
| 5,014,052 A | 5/1991 | Obeck |
| 5,043,736 A | 8/1991 | Darnell et al. |
| 5,068,656 A | 11/1991 | Sutherland |
| 5,072,227 A | 12/1991 | Hatch |
| 5,083,125 A | 1/1992 | Brown et al. |
| 5,089,815 A | 2/1992 | Potter et al. |
| 5,119,102 A | 6/1992 | Barnard |
| 5,172,113 A | 12/1992 | Hamer |
| 5,177,489 A | 1/1993 | Hatch |
| 5,187,373 A | 2/1993 | Gregori |
| 5,187,476 A | 2/1993 | Hamer |
| 5,204,675 A | 4/1993 | Sekine |
| 5,214,757 A | 5/1993 | Mauney et al. |
| 5,334,974 A | 8/1994 | Simms et al. |
| 5,345,232 A | 9/1994 | Robertson |
| 5,515,042 A | 5/1996 | Nelson |
| 5,539,398 A | 7/1996 | Hall et al. |
| 5,602,739 A | 2/1997 | Haagenstad et al. |
| 5,633,629 A * | 5/1997 | Hochstein .................. 340/907 |
| 5,710,555 A | 1/1998 | McConnell et al. |
| 5,745,865 A | 4/1998 | Rostoker et al. |
| 5,889,475 A | 3/1999 | Klosinski et al. |
| 5,926,113 A | 7/1999 | Jones et al. |
| 5,955,968 A | 9/1999 | Bentrott et al. |
| 5,986,575 A | 11/1999 | Jones et al. |
| 6,064,319 A | 5/2000 | Matta |
| 6,087,961 A | 7/2000 | Markow |
| 6,232,889 B1 | 5/2001 | Apitz et al. |
| 6,243,026 B1 | 6/2001 | Jones et al. |
| 6,326,903 B1 | 12/2001 | Gross et al. |
| 6,339,382 B1 | 1/2002 | Arbinger et al. |
| 6,577,946 B2 | 6/2003 | Myr |
| 6,603,975 B1 | 8/2003 | Inouchi et al. |
| 6,617,981 B2 | 9/2003 | Basinger |
| 6,621,420 B1 | 9/2003 | Poursartip |
| 6,633,238 B2 | 10/2003 | Lemelson et al. |
| 6,690,293 B2 | 2/2004 | Amita |
| 6,724,320 B2 | 4/2004 | Basson et al. |
| 6,807,464 B2 | 10/2004 | Yu et al. |
| 6,909,380 B2 | 6/2005 | Brooke |
| 6,940,422 B1 | 9/2005 | Bachelder et al. |
| 6,970,102 B2 | 11/2005 | Ciolli |
| 2001/0037203 A1 | 11/2001 | Satoh |
| 2003/0095688 A1 | 5/2003 | Kirmuss |
| 2003/0164775 A1 | 9/2003 | Hutchison et al. |
| 2004/0196162 A1 | 10/2004 | Brooke |
| 2005/0104745 A1 | 5/2005 | Bachelder et al. |
| 2005/0116838 A1 | 6/2005 | Bachelder et al. |
| 2005/0128103 A1 | 6/2005 | Bachelder |
| 2007/0040700 A1* | 2/2007 | Bachelder .................. 340/902 |

FOREIGN PATENT DOCUMENTS

| | | |
|---|---|---|
| FR | 2 670 002 A1 | 6/1992 |
| FR | 2 693 820 A1 | 1/1994 |

OTHER PUBLICATIONS

*The Traffic Preemption System for Emergency Vehicles Based on Differential GPS and Two-Way Radio*, http://www.greenf.com/traffic.htm, Greenfield Associates website, 1999, 6 pgs.

Zhaosheng Yang and Deyong Guan, *Study on the Scheme of Traffic Signal Timing for Priority Vehicles Based on Navigation System*, 2001 IEEE, pp. 249-254.

Veerender Kaul, *Microwave Technology: Will it Threaten the Dominance of Optical Signal Preemption Systems?*, May 8, 2002, 5 pgs.

Horst E. Gerland, *Traffic Signal Priority Tool to Increase Service Quality and Efficiency*, Prepared for: APTA Bus Operations Conference 2000, Salem Apr. 2000, 9 pgs.

M. Miyawaki, et al., *Fast Emergency Preemption Systems (FAST)*, 1999 IEEE, pp. 993-997.

K. Fox et al., *UTMC01 Selected Vehicle Priority in the UTMC Environment (UTMC01)*, UTMC01 Project Report 1- Part A, Oct. 19, 1998, 45 pgs.

U.S. Department of Transportation, *Advanced Transportation Management Technologies*, Chapter 6, Transit-Management Systems, Publication No. FHWA-SA-97-058, Apr. 1997, pp. 6-1 through 6-23.

J.D. Nelson, et al., *The Modelling of Realistic Automatic Vehicle Locationing Systems for Service and Traffic Control*, Nov. 9-11, 1995, pp. 1582-1587.

*Assessment of the Application of Automatic Vehicle Identification Technology to Traffic Management*, Appendix C: Evaluation of Potential Applications of Automatic Vehicle Monitoring to Traffic Management, Federal Highway Administration, Jul. 1977, 28 pgs.

Robert N. Taube, *Bus Actuated Signal Preemption Systems: A Planning Methodology*, Department of Systems-Design, University of Wisconsin-Milwaukee, May 1976, 120 pgs.

*Assessment of the Application of Automatic Vehicle Identification Technology to Traffic Management*, Federal Highway Administration, Jul. 1977, 44 pgs.

R. M. Griffin and D. Johnson, *A report on the first part of the Northampton Fire Priority Demonstration Scheme-the 'before' study and EVADE*, Crown Copyright 1980, 4 pgs.

P. M. Cleal, *Priority for Emergency Vehicles at Traffic Signals*, Civil Engineering Working Paper, Monash University, Dec. 1982, 38 pgs.

P. Davies, et al., *Automatic Vehicle Identification for Transportation Monitoring and Control*, 1986, pp. 207-224.

N. B. Hounsell, *Active Bus Priority at Traffic Signals*, UK Developments in Road Traffic Signaling, IEEE Colloquium, May 5, 1988, 5 pgs.

C. B. Harris, et al., *Digital Map Dependent Functions of Automatic Vehicle Location Systems*, 1988 IEEE, pp. 79-87.

P. L. Belcher and I. Catling, *Autoguide-Electronic Route Guidance for London and the U.K.*, 1989 IEEE Road Traffic Monitoring, pp. 182-190.

N. Ayland and P. Davies, *Automatic Vehicle Identification for Heavy Vehicle Monitoring*, 1989 IEEE Road Traffic Monitoring, pp. 152-155.

K. Keen, *Traffic Control at a Strategic Level*, 1989 IEEE Road Traffic Monitoring, pp. 156-160.

K. W. Huddart, *Chapter 7: Urban Traffic Control*, Mobile Information Systems, 1990 Artech House, Inc., 23 pgs.

S. Yagar and E. R. Case, *A Role for VNIS in Real-Time Control of Signalized Networks?*, 1991, pp. 1105-1109.

R. F. Casey, et al., *Advanced Public Transportation Systems: The State of the Art*, U.S. Department of Transportation, Apr. 1991, 91 pgs.

M. F. McGurrin, et al., *Alternative Architectures for ATIS and ATMS*, IVHS Proceedings, May 1992, pp. 456-467.

A. Ceder and A. Shilovits, *A Traffic Signalization Control System with Enhancement Information and Control Capabilities*, 1992 Road Transport Informatics Intelligent Vehicle Highway Systems, pp. 325-333.

*Summary of Findings: Orange County IVHS Review*, Orange County Intelligent Vehicle/Highway Systems Study, JHK & Associates, Aug. 11, 1992, 86 pgs.

*Automatic Vehicle Location/Control and Traffic Signal Preemption Lessons from Europe*, Chicago Transit Authority, Sep. 1992, 140 pgs.

J.D. Nelson et al., *Approaches to the Provision of Priority for Public Transport at Traffic Signals: A European Perspective*, Traffic Engineering Control, Sep. 1993, pp. 426-428.

M. D. Cheslow and S. G. Hatcher, *Estimation of Communication Load Requirements for Five ATIS/ATMS Architectures*, 1993 Proceedings of the IVHS America, pp. 473-479.

M. Kihl and D. Shinn, *Improving Interbus Transfer with Automatic Vehicle Location Year One Report*, Aug. 1993, 35 pgs.

Gunnar Andersson, article entitled *Fleet Management in Public Transport*, The 3rd International Conference on Vehicle Navigation & Information Systems, Oslo, Sep. 2-4, 1992, pp. 312-317.

Horst E. Gerland, *ITS Intelligent Transportation System: Fleet Management with GPS Dead Reckoning, Advanced Displays, Smartcards, etc.*, IEEE-IEE Vehicle Navigation & Information Systems Conference, Ottawa—VNIS '93, pp. 606-611.

Robert F. Casey, M.S., Lawrence N. Labell, M.S., *Evaluation Plan for AVL Implementation in Four U.S. Cities*, May 17-20, 1992 IVHS America Proceedings, 11 pgs.

David A. Blackledge et al., *Electronic Passenger Information Systems—Do They Give the Public What They Want?*, PTRC 19th Summer, Sep. 9-13, 1991 Annual Meeting, pp. 163-176.

American City & County Website, http://www.americancityandcounty.com, *City uses technology to track buses, emergency vehicles*, Jun. 1, 2001, 1 pg.

Vol. Two, The Proceedings of the 1992 Annual Meeting of IVHS America, Surface Transportation and the Information Age, May 17-20, 1992, Newport Beach, CA, 13 pgs.

Labell et al., *Advanced Public Transportation Systems: The State of the Art, Update '92*, U.S. Department of Transportation Federal Transit Administration, 97 pgs.

Stearns et al., *Denver RTD's Computer Aided Dispatch/Automatic Vehicle Location System: the Human Factors Consequences*, U.S. Department of Transportation, Federal Transit Administration, Sep. 1999, 82 pgs.

APTS Project Summaries, http://www.itsdocs.fhwa.dot.gov, *Advanced Public Transportation Systems (APTS) Project Summaries*, Jun. 1996, Office of Mobility Innovation, 33 pgs.

Brendon Hemily, PhD., *Automatic Vehicle Location in Canadian Urban Transit; a Review of Practice and Key Issues*, Dec. 1988, AATT Conference Feb. 1989, pp. 229-233.

Canadian Urban Transit Association, *Proceedings, The International Conference on Automatic Vehicle Location in Urban Transit Systems*, Sep. 19-21, 1988, Ottawa, Canada, 17 pgs.

1991 TAC Annual Conference, *Proceedings*, vol. 4, Transportation: Toward a Better Environment, 21 pgs.

Casey et al., *Advanced Public Transportation Systems: The State of the Art*, U.S. Department of Transportation Urban Mass Transportation Administration, Component of Departmental IVHS Initiative, Apr. 1991, 91 pgs.

U.S. Department of Transportation, *German "Smart-Bus" Systems, Potential for Application in* Portland, Oregon, vol. 1, *Technical Report*, Jan. 1993, Office of Technical Assistance and Safety, Advanced Public Transportation Systems Program, A Component of the Departmental IVHS Initiative, 107 pgs.

ARUP, *Traffic Management for Bus Operations Main Report*, Prepared by Ove Arup Transportation Planning for the Public Transport Corporation, Dec. 1989, 123 pgs (front and back).

Randy D. Hoffman, et al. *DGPS, IVHS Drive GPS Toward Its Future*, GPS World Showcase, Dec. 1992, 1 pg.

Horst E. Gerland, *FOCCS—Flexible Operation Command and Control System for Public Transport*, PTRC 19th Summer Sep. 9-13, 1991 Annual Meeting, pp. 139-150.

L. Sabounghi et al., *The Universal Close-Range Road/Vehicle Communication System Concept The Numerous Applications of the Enhanced AVI*, 1991 TAC Annual Conference, pp. A41, A43-A62.

R. L. Sabounghi, *Intelligent Vehicle Highway System—The Universal Close-Range Road/Vehicle Communication System Concept—The Enhanced AVI and Its CVO Applications*, 1991, VNIS '91, Vehicle Indication and Information Systems Conference Proceedings, pp. 957-967.

Clarioni, et al., *Public Transport Fleet Location System Based on DGPS Integrated with Dead Reckoning*, Road Vehicle Automation, Jul. 12, 1993, pp. 259-268.

Bernard Held, *Bus Priority: A Focus on the City of Melbourne*, Aug. 1990, Monash University, pp. 157-160, and 180-189.

\* cited by examiner

ROADSIDE-BASED COMMUNICATION SYSTEM AND METHOD

CROSS-REFERENCE TO RELATED APPLICATION(S)

This application claims the benefit of U.S. Provisional Application No. 60/602,769, filed on Aug. 18, 2004, the content of which is incorporated herein by reference.

STATEMENT REGARDING FEDERALLY SPONSORED RESEARCH OR DEVELOPMENT

The invention described herein was made in the performance of work under a NASA contract, and is subject to the provisions of Public Law 96-517 (35 U.S.C. § 202) in which the Contractor has elected to retain title.

BACKGROUND OF THE INVENTION

Attacks such as the 9/11 attack has caused a major shift in focus with respect to emergency response. Most notably is the need for backup and emergency communications, especially during catastrophic disasters when existing commercial infrastructure often fails or is not available. As the 9/11 commission final report outlines, there are two key communication issues that need to be addressed. The first issue is the compatibility of communication equipment between different agencies and different jurisdictions (e.g. city and state). The second issue is the availability of communication networks in the event of the destruction of city infrastructure.

Accordingly, what is desired is a backup and/or redundant communications system that addresses the compatibility and availability issues for emergency response.

SUMMARY OF THE INVENTION

According to one embodiment, the present invention is directed to a roadside system that includes a mobile unit, a roadside control unit, and a command center. The mobile unit includes a transmitter that transmits a wireless signal. The roadside control unit controls one or more traffic control devices coupled to an intersection. The roadside control unit further receives the wireless signal, converts the wireless signal into a corresponding digital stream, processes the digital stream and identifies a destination, and forwards the digital stream to the identified destination. The command center receives the digital stream and generates an output in response.

According to one embodiment of the invention, the mobile unit is a mobile phone transmitting a phone call via the roadside control unit.

According to one embodiment of the invention, the roadside control unit is an intersection controller controlling one or more traffic lights at the intersection.

According to one embodiment of the invention, the output is a message back to the mobile unit.

According to one embodiment of the invention, the roadside control unit forwards the digital stream over a wired network.

According to one embodiment of the invention, the roadside control unit is a backup communication system, and the mobile unit transmits the wireless signal to the roadside control unit in response to a detection of unavailability of a primary communication system.

According another embodiment, the present invention is directed to a roadside control unit coupled between a mobile unit and a command center, where the roadside control unit is associated with an intersection including traffic signals. The roadside control unit includes a transceiver for wirelessly communicating with the mobile unit, a processor, and a memory operably coupled to the processor and storing program instructions therein, where the processor is operable to execute the program instructions. The program instructions include controlling the traffic signals based on predetermined conditions, receiving a wireless signal transmitted by the mobile unit, converting the wireless signal into a corresponding digital stream, processing the digital stream and identifying a destination, and forwarding the digital stream to the command center based on the identified destination.

According to one embodiment of the invention, the program instructions further include receiving a message from the command center, identifying the mobile unit, and forwarding the message to the mobile unit.

According to another embodiment, the present invention is directed to a method for providing backup communication via a roadside control unit coupled between a mobile unit and a command center, where the roadside control unit is associated with an intersection that includes traffic signals. The method includes receiving by the roadside control unit a wireless signal transmitted by the mobile unit, converting by the roadside control unit the wireless signal into a corresponding digital stream, processing by roadside control unit the digital stream and identifying a destination, and forwarding by the roadside control unit the digital stream to the command center based on the identified destination. According to this embodiment, the roadside control unit provides the backup communication in response to a detection of unavailability of primary communication.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, the present invention is directed to roadside-based communication system which provides a backup and/or redundant (collectively referred to as backup) communication infrastructure for communication between first (emergency) responders and emergency command centers. For example, the backup communication infrastructure may be activated in the event of failure of a primary communication infrastructure.

The design of the roadside-based communication system addresses the compatibility issue raised by the 9/11 commission by using roadside units that are configured to receive compliant incoming messages from different mobile units, and further configured to convert those messages into standard digital streams that are forwarded to emergency command centers via a city or regional network. Existing intersection controllers may be used for the roadside units.

The design of the roadside-based communication system also addresses the availability issue raised by the 9/11 commission. The design allows for redundancy due to the number of roadside units at or near intersections throughout a city. The mobile units, roadside units, and command centers also remain functional during loss of conventional power by invoking some type of backup power associated with these devices, such as, for example, battery or solar-power.

Figure 1:
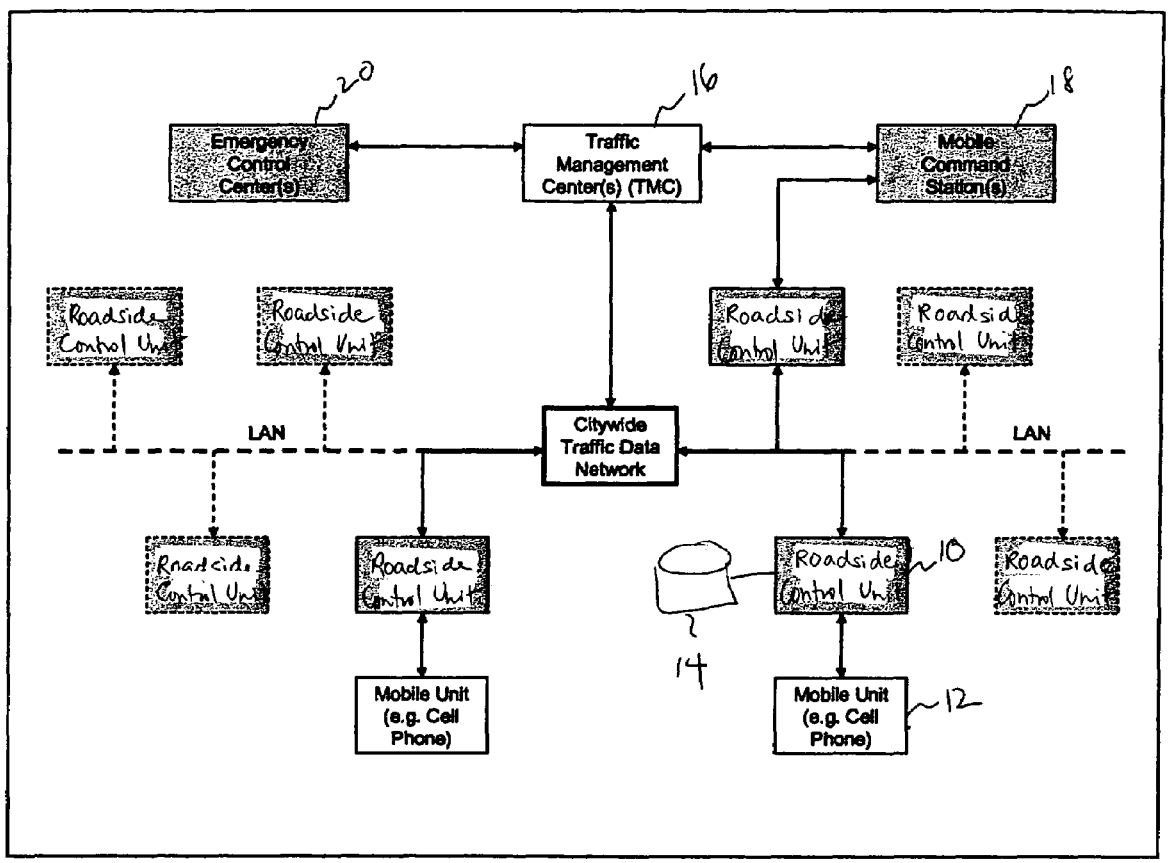
FIG. 1 is a block diagram of a roadside-based, backup communication system according to one embodiment of the invention.

FIG. 1 is a block diagram of a roadside-based, backup communication system according to one embodiment of the invention. The system includes a plurality of mobile units 12 that may be carried by first (emergency) responders or incorporated into responder vehicles. The mobile units 12 communicate with a traffic management center (TMC) 16, mobile command station 18, and/or emergency control center 20 (collectively referenced as an emergency command center 16) via a backup communication infrastructure that includes one or more roadside control units 10. The backup communication infrastructure may be invoked during emergencies when an existing communication infrastructure has failed or is not available. Alternatively, all emergency communications between emergency responders and emergency command centers utilize the backup communication infrastructure.

In effectuating the communication with the emergency command centers 16, the mobile units 12 transmit wireless messages to the roadside control units 10 via any existing wireless technology known in the art, such as, for example, Bluetooth technology or 802.11 technology. The roadside control units 10 then forward the messages to the command centers 16 over a wired data communications network such as, for example, a local area network (LAN), wide area network (WAN), or the public Internet. Preferably, the data communications network is a city or regional network that is owned, maintained, and secured by city or regional agencies. The data communications network may also take the form of a telephone or cellular network capable of transmitting both voice and data in a wired or wireless manner.

The command centers are equipped with necessary hardware and software for receiving and processing voice and other types of data transmitted by the mobile units, and generating an output in response. For example, the command center may forward the received data over a communication network used at the center for delivering the data to individual emergency command personnel. The emergency command center may also forward voice or data messages generated by the emergency command personnel to the roadside control units for forwarding to the transmitting mobile units. The emergency command center may further output commands for managing traffic lights, roadways, intersections, emergency vehicles, and the like.

Each roadside control unit 10 is coupled to a local storage device 14 such as, for example, a hard drive or drive array, configured with one or more databases that store information for enabling backup communication between the mobile units and the command centers 16. For example, each roadside control unit 10 may maintain a list of destination addresses of command centers reachable via the roadside control unit.

The mobile units may be citizen-band (CB) radios, pagers, cellular phones, personal digital assistants, or another type of mobile communication device conventional in the art. The mobile units may further be coupled to in-vehicle devices such as, for example, in-vehicle PCs, monitors, speakers, microphones, and the like, for use as alternate inputs or outputs of information to and form the emergency command centers 16.

The roadside units 10 may be located at an intersection or on a roadside near an intersection. According to one embodiment of the invention, the roadside control units 10 take the form of intersection control units including intersection controllers that are configured to control one or more traffic control devices such as, for example, traffic lights, red-light running detection devices, traffic loop control devices, and the like, based on predetermined conditions. Necessary hardware and software for providing the backup communication functionality may be added on top of any existing hardware and software in the intersection controllers controlling the traffic control devices. Alternatively, the functionality may be provided via secondary hardware and software that may be coupled to each intersection controller.

According to one embodiment of the invention, each roadside control unit 10 presents a fixed communication "satellite," "node," or "micro-cell site" in the backup communication system, where each roadside control unit 10 covers a relatively small radio-frequency (RF) footprint of about 100 feet to 1 mile. Because the roadside control units are spread over various, uniformly-separated intersections in a city, the backup communication system allows for redundant, high-bandwidth, and robust connection for the mobile units. The high bandwidth also enables transmission of high-bandwidth data such as, for example, video, between the mobile units, intersections, and command centers. Furthermore, in the embodiment where a mobile unit is in communication with an in-vehicle PC unit via, for example, a Bluetooth transceiver, the high-bandwidth allows for real-time web browsing and other internet activities via an in-vehicle PC unit.

Figure 2:
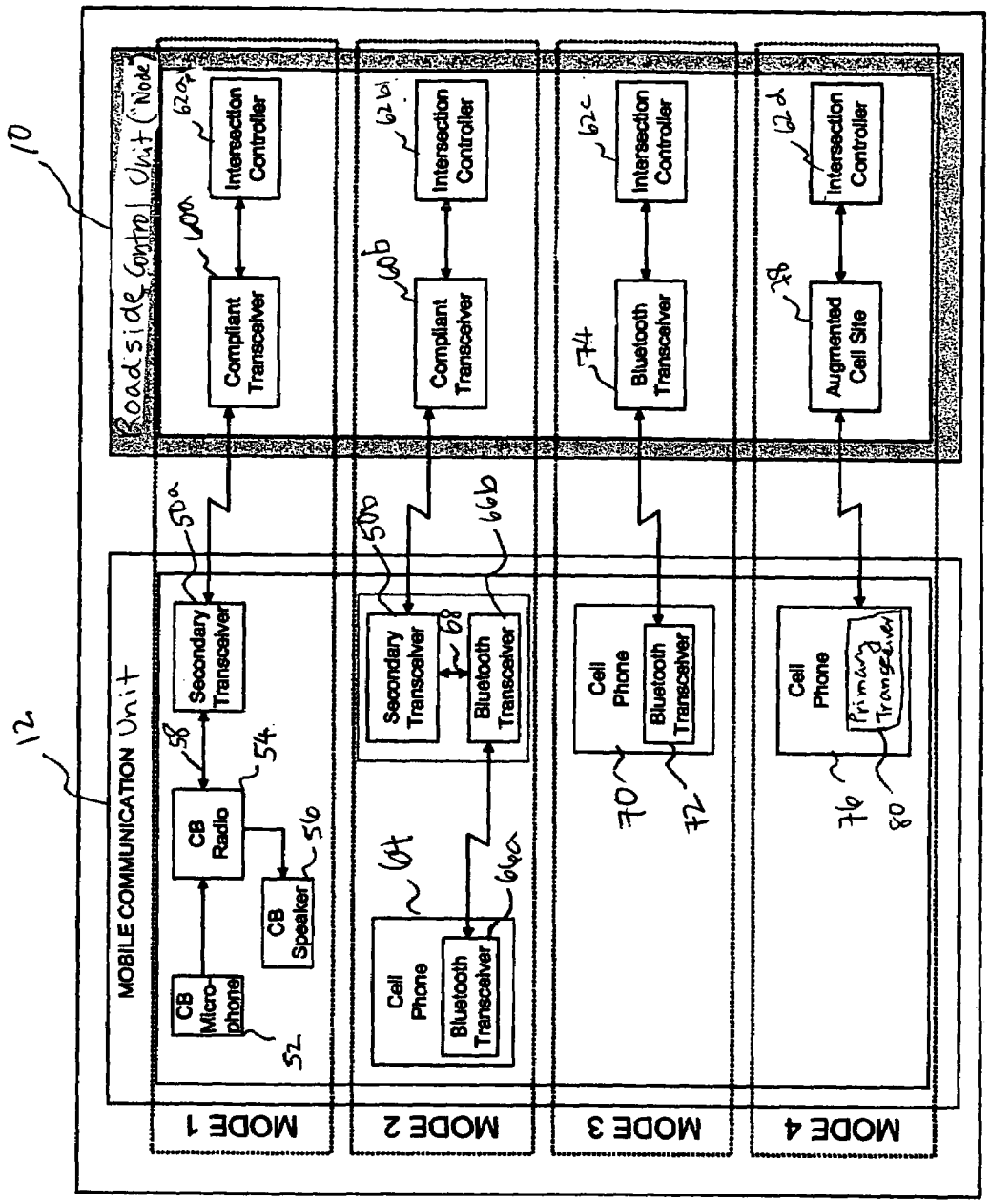
FIG. 2 is a more detailed block diagram of mobile and roadside control units in the backup communication system of FIG. 1 according to one embodiment of the invention.

FIG. 2 is a more detailed block diagram of the mobile and roadside control units 12, 10 in the backup communication system according to one embodiment of the invention. In order to reduce costs, the backup communication system leverages on existing communication devices typically used by the emergency responders for the backup communication. For example, the system may leverage on existing microphones and transceivers in CB radios, cellular phones, pagers, and the like, for the input of data to be communicated over the backup communication system. If a transceiver already included in a mobile unit is not configured to communicate with the roadside control units 10, a secondary transceiver may be provided for transmitting RF messages that are compliant with city or regional communication protocols adhered to by the roadside control units 10. The secondary transceiver may be included in the mobile unit, or placed externally in communication with the mobile unit.

According to another embodiment of the invention, the roadside control units 10 are equipped with different types of transceivers that may be used by the mobile units to allow such mobile units to communicate with the roadside control units even if they do not comply with city or regional communication protocols. Of course, the use of the secondary transceivers reduces the number/types of transceivers required at each roadside control unit, and standardizes transmissions to and from the mobile units.

In one mode of operation, the mobile unit 12 takes the form of a CB radio 54. The CB radio is coupled to a CB microphone 52 and CB speaker 56. The CB radio is further coupled to a secondary transceiver 50a that may take the form of a spread-spectrum transceiver with appropriate hardware for handling the format of the data (analog or digital) from the CB radio interface. Voice messages are relayed from the CB microphone 52 to the CB radio 54 which forwards the messages to the secondary transceiver 50a over an input/output cable 58. The voice messages are encoded with a destination address of a command center functioning as a CB dispatch center.

The secondary transceiver 50a wirelessly transmits the voice messages relayed by the CB microphone 52 to a nearby roadside control unit 10 in a manner that is compliant with the data communication protocol adhered to by the roadside control units, such as, for example, a city or regional communication protocol. The roadside control unit 10 is equipped with a transceiver 60a configured to function according to the adhered communication protocol. The compliant transceiver 60a translates the voice messages into digital streams, and exports the streams to a roadside controller such as, for example, an intersection controller 62a. The intersection controller 62a decomposes each digital stream to identify the address of the CB dispatch center to which the digital stream is to be transmitted. Once the roadside controller is able to identify the particular CB dispatch center, the controller transmits the stream to the CB dispatch center. The CB dispatch center then broadcasts the messages to a subscribing group of mobile units using its own communication network.

In a second mode of operation, the mobile unit 12 takes the form of a cellular phone 64. In this mode, the cellular phone is the primary microphone device for transmitting voice messages over the backup communications infrastructure. A person of skill in the art should appreciate, however, that although voice is used as a primary example of data that may be communicated over the backup communications system, other types of data may also be transmitted, including, for example, video, photo, and text.

According to the second mode of operation, a secondary transceiver 50b which may be similar to the secondary transceiver 50a of the first mode is used for communicating with the roadside control unit 10. The cellular phone communicates with the secondary transceiver 50b over a short-range WiFi communications link such as, for example, a Bluetooth or 802.11 communications link. If Bluetooth technology is used, the cellular phone includes a first Bluetooth transceiver 66a that communicates with a second Bluetooth transceiver 66b coupled to the secondary transceiver via a cable 68. The secondary transceiver 50b then wirelessly transmits the message relayed by the cellular phone 64, to a compliant transceiver 60b in the roadside control unit 10. The compliant transceiver 60b may be similar to the compliant transceiver 60a in the first mode of operation. The compliant transceiver 60b then proceeds to translate the message into a data stream, and forward the data stream to an intersection controller 62b which may be similar to the intersection controller 62a in the first mode of operation. The intersection controller 62b identifies the destination of the message and forwards the message to the destination over the data communications network.

In a third mode of operation, the mobile unit 12 again takes the form of a cellular phone 70. However, a second transceiver that complies with the city or regional communications protocol is not used for communicating with the roadside control unit 10. Instead, a Bluetooth transceiver 72 that may already be included with the cellular phone 70 is used for relaying data generated by the phone. In this mode, the roadside control unit 10 also includes a Bluetooth transceiver 74 configured to communicate with the Bluetooth transceiver 72 in the cellular phone 70. Data received by the Bluetooth transceiver 74 is translated into a digital data stream and forwarded to an intersection controller 62c. The intersection controller 62c may be similar to the intersection controllers 62a, 62b in the first and second modes of operation.

Given the shorter range of Bluetooth radios, the rage of each intersection's coverage in this mode of operation is limited to about 100-200 feet. Thus, each equipped roadside control unit may be deemed as an "emergency station," where an emergency responder may communicate via the roadside control unit during emergencies if they are in close proximity (e.g. within a block) of the equipped intersection. Such a mode of operation may still be appealing due to the reduced cost of implementing the system given that may new cellular phones already incorporate Bluetooth technology.

In a fourth mode of operation, the mobile unit 12 again takes the form of a cellular phone 76. The cellular phone 76 includes a primary transceiver 80 configured for conventional cellular communication via a traditional cellular site. When the traditional cellular site cannot be seen (e.g. no signal), the primary transceiver communicates with an augmented cellular site 78 provided by the roadside control unit 10. The augmented cellular site 78 may be implemented using traditional cellular site hardware, such as, for example, one or more conventional repeaters. The cellular site hardware for the augmented cellular site 78, however, may be scaled-down to support lower power and reduced RF coverage than the traditional cellular site. For example, the coverage of the augmented cellular site may be limited to a mile from a particular intersection where the roadside control unit 10 is located.

According to one embodiment, the augmented cellular site 78 uses the same frequency as the traditional cellular site. However, only those calls that contain priority encoded information are allowed to be initiated or carried through the augmented cellular site 78.

According to another embodiment of the invention, the augmented cellular site 78 uses a different (emergency) frequency (e.g. a Homeland Security FCC-approved band) than the commercial frequency used by the traditional cellular site. The augmented cellular site may also employ alternate communication protocols than the traditional cellular site. According to this embodiment, the cellular phone 76 supports this dual frequency use. Emergency phone calls are automatically re-routed in real-time across the backup communication infrastructure using the emergency frequency, even if there has been no loss of primary communication. Non-emergency phone calls are conducted via the traditional cellular sites using a commercial frequency.

According to one embodiment of the invention, the emergency data transmitted by the cellular phone 76 is translated by the augmented cell site hardware into a digital data stream and forwarded to an intersection controller 62d, which may be similar to the intersection controllers 62a, 62b, 62c of the first, second, and third modes of operation. The intersection controller 62d identifies a destination command center 16 and proceeds to forward the data stream to the destination command center.

According to another embodiment of the invention, the augmented cell site 78 may connect to a traditional telephone or cellular network for transmitting the wireless data to its destination over the traditional telephone or cellular network.

Figure 3:
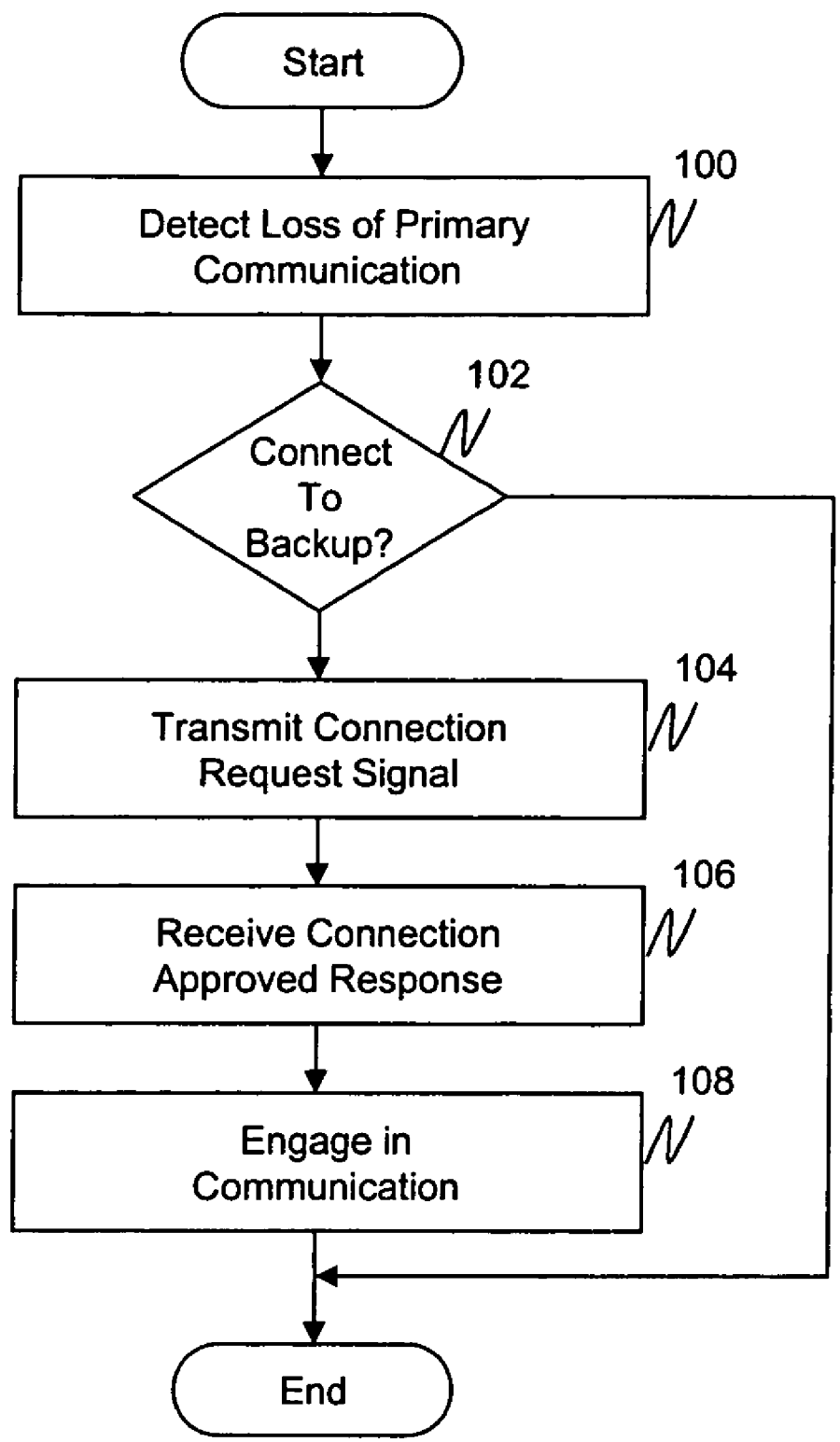
FIG. 3 is a flow diagram of a process for initiating communication via a roadside control unit according to one embodiment of the invention.

FIG. 3 is a flow diagram of a process for initiating communication via the roadside control unit 10 according to one embodiment of the invention. For purposes of this flow diagram, it is assumed that the mobile unit is a cellular phone, such as, for example, cellular phone 64, 70, or 76. The process may be implemented via software, firmware, and/or hardware residing in the cellular phone.

In step 100, the mobile unit 10 automatically detects loss of communication with a primary communication infrastructure. Such a determination may be made, for example, based on a number of connection retries with a primary cell site. If a predetermined number of connection retries have been made without success, primary connection is deemed to be lost.

In step 102, a determination is made as to whether the mobile unit is to connect to the backup communication infrastructure. According to one embodiment of the invention, the connection to the backup communication infrastructure may be automatic upon detecting loss of primary communication. According to another embodiment of the invention, the connection to the backup communication infrastructure is manually initiated in response to a user command (e.g. upon the pressing of a particular button or selecting a particular menu item on the cellular phone).

Upon determining that a connection is to be made with the backup communication infrastructure, the cellular phone uses the secondary transceiver 50*b*, Bluetooth transceiver 72, or existing primary transceiver 80 for broadcasting a connection request signal in step 104. Nearby roadside control units 10 receive the connection request signal and those available for conducting communication respond with a connection approved response. The connection approved response includes an identifier of the responding roadside control unit 10. According to one embodiment of the invention, prior to transmitting the approved response, the responding roadside control unit may determine whether the mobile unit is authorized for backup communication via the roadside control unit. For example, the roadside control unit may search for particular codes encoded in the connection request.

In step 106, the mobile unit 12 receives a connection approved response from one or more roadside control units, and selects one of the responding control units for making the backup communication connection. For example, the mobile unit 12 may automatically select and connect to a responding roadside control unit 10 closest to the mobile unit.

In step 108, the mobile unit 12 engages in communication via the selected roadside control unit. The mobile unit may provide a list of phone numbers of one or more command centers (or devices reachable via the command centers) that may be selected by a user of the mobile unit 12 for engaging in communication via the backup connection. The communication may be voice communication (e.g. circuit or walkie-talkie based), or data communication for transmitting and receiving text, video, photos, and the like.

According to one embodiment of the invention, the process for initiating communication via the roadside control unit 10 for mobile units other than cellular phones may be similar to the process illustrated in FIG. 3. However, the detection of loss of primary communication may or may not be automatically determined in a non-cell mode of operation. For example, if the mobile unit is the CB radio 54, the operator of the CB radio 54 may assess that the primary communication is down if traditional CB radio communication is unsuccessful. In this situation, the CB radio operator may manually select to communicate via the second transceiver 50*a* by selecting a particular button, switch, and the like. Furthermore, it may not be necessary to detect loss of primary communication if usage of backup communication is assumed. For example, communication from emergency responders may always utilize the backup communication.

Figure 4:
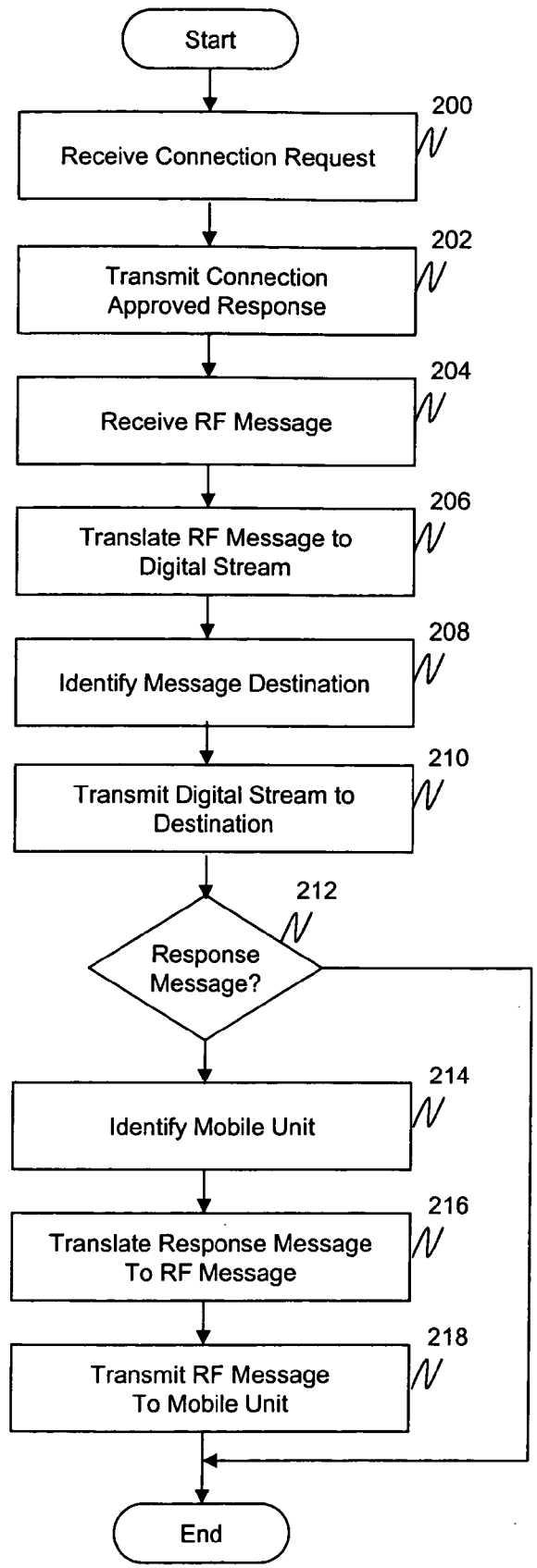
FIG. 4 is a flow diagram of a process engaged by a roadside control unit for handling communication with a mobile unit according to one embodiment of the invention.

FIG. 4 is a flow diagram of a process engaged by the roadside control unit 10 for handling communication with the mobile unit 10 according to one embodiment of the invention. In step 200, the roadside control unit's transceiver 60*a*, 60*b*, 74 or augmented cell site 78 receives a connection request from a nearby mobile unit. In step 202, if the roadside unit is available for the backup communication, the unit transmits, via the transceiver 60*a*, 60*b*, 74 or augmented cell site 78, a connection approved response. If an access code is required for the communication to occur, the roadside unit searches the connection request for a valid access code before the connection approved request is transmitted.

In step 204, the transceiver 60*a*, 60*b*, 74 or augmented cell site 78 receives a compliant RF message from the mobile unit. The message includes, at least, a recipient address or number to whom the message is to be transmitted.

In step 206, the transceiver 60*a*, 60*b*, 74 or augmented cell site 78 translates the RF message into a standard digital stream according to conventional mechanisms, and forwards the digital stream to a roadside controller such as, for example, intersection controller 62*a*, *b*, *c*, or *d*. The roadside controller may include a processor and associated memory storing computer program instructions which, when executed by the processor, cause the processing of the digital stream. The processing includes analyzing the digital stream in step 208 for determining the destination of the digital data stream. According to one embodiment of the invention, the roadside controller searches the local storage device 14 coupled to the roadside control unit for a network address corresponding to a destination included in the message. Such a destination may be, for example, an emergency command center 16 or a destination reachable via the emergency command center.

In step 210, the roadside controller routes the digital data stream to the network address via the data communications network.

For the cellular-based modes of operation, the transceiver 60*b*, 74 or augmented cell site 78 may, according to another embodiment of the invention, broadcast a request for the presence and location of a destination phone by requesting response from the destination number. The transceiver 60*b*, 74 or augmented cell site 78 may also connect to a traditional telephone or cellular network for determining if the destination phone is available over the traditional communications network.

In step 212, a determination is made as to whether a response message was received from the destination. If the answer is YES, the roadside controller identifies in step 214, the mobile unit to which the response message is to be transmitted. In this regard, the response message includes at least mobile unit identifier, such as, for example, a phone number of the mobile unit. In step 216, the transceiver 60*a*, 60*b*, 74 or augmented cell site 78 translates the response message to an RF message, and wirelessly transmits the RF message to the identified mobile unit in step 218.

According to one embodiment of the invention, the backup communication system allows security in the communication to and from an emergency responder's mobile unit. In this regard, communication between the various transceivers are encoded using any of the various encryption mechanisms known in the art. Furthermore, the relatively small RF transmission power used throughout the system is an inherent advantage to security since communication may be kept to local areas. The intersection controllers 62a-62d also provide active security by authenticating users and monitoring all backup communication traffic. Because the intersection controllers, citywide networks, and emergency responder communication devices are owned, maintained, and secured by city agencies, communication across these platforms stay within the confines of city-owned system.

Although this invention has been described in certain specific embodiments, those skilled in the art will have no difficulty devising variations to the described embodiment which in no way depart from the scope and spirit of the present invention. For example, although use of the backup communication infrastructure is contemplated if the primary, commercial communication infrastructure has failed or is not available, the backup communication infrastructure may be used for all communications between emergency mobile units and emergency command centers even if the primary, commercial communication infrastructure is up and running.

Furthermore, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A roadside system comprising:
   a mobile unit including a transmitter transmitting a wireless signal;
   a roadside control unit controlling one or more traffic control devices coupled to an intersection, the roadside unit further receiving the wireless signal, converting the wireless signal into a corresponding digital stream, processing the digital stream and identifying a destination, and forwarding the digital stream to the identified destination; and
   a command center receiving the digital stream and generating an output in response.

2. The roadside system of claim 1, wherein the mobile unit is a mobile phone transmitting a phone call via the roadside control unit.

3. The roadside system of claim 1, wherein the roadside control unit is an intersection controller controlling one or more traffic lights at the intersection.

4. The roadside system of claim 1, wherein the output is a message back to the mobile unit.

5. The roadside system of claim 1, wherein the roadside control unit forwards the digital stream over a wired network.

6. The roadside system of claim 1, wherein the roadside control unit is a backup communication system, and the mobile unit transmits the wireless signal to the roadside control unit in response to a detection of unavailability of a primary communication system.

7. A roadside control unit coupled between a mobile unit and a command center, the roadside control unit being associated with an intersection including traffic signals, the roadside control unit comprising:
   a transceiver wirelessly communicating with the mobile unit;
   a processor; and
   a memory operably coupled to the processor and storing program instructions therein, the processor being operable to execute the program instructions, the program instructions including:
      controlling the traffic signals based on predetermined conditions;
      receiving a wireless signal transmitted by the mobile unit;
      converting the wireless signal into a corresponding digital stream;
      processing the digital stream and identifying a destination; and
      forwarding the digital stream to the command center based on the identified destination.

8. The roadside control unit of claim 7, wherein the wireless signal is a cellular phone signal.

9. The roadside control unit of claim 7, wherein the digital stream is forwarded over a wired network.

10. The roadside control unit of claim 7, wherein the program instructions further include:
    receiving a message from the command center;
    identifying the mobile unit; and
    forwarding the message to the mobile unit.

11. The roadside control unit of claim 7, wherein the roadside control provides backup communication between the mobile unit and the command center in response to a detection of unavailability of primary communication.

12. A method for providing backup communication via a roadside control unit coupled between a mobile unit and a command center, the roadside control unit being associated with an intersection including traffic signals, the method comprising:
    receiving by the roadside control unit a wireless signal transmitted by the mobile unit;
    converting by the roadside control unit the wireless signal into a corresponding digital stream;
    processing by roadside control unit the digital stream and identifying a destination; and
    forwarding by the roadside control unit the digital stream to the command center based on the identified destination,
    wherein, the roadside control provides the backup communication in response to a detection of unavailability of primary communication.

13. The method of claim 12, wherein the wireless signal is a cellular phone signal.

14. The method of claim 12, wherein the digital stream is forwarded over a wired network.

15. The method of claim 12 further comprising:
    receiving a message from the command center;
    identifying the mobile unit; and
    forwarding the message to the mobile unit.

16. The method of claim 12 further comprising:
    controlling the traffic signals by the roadside control unit based on predetermined conditions.

* * * * *